(12) United States Patent
Park et al.

(10) Patent No.: US 6,616,754 B1
(45) Date of Patent: Sep. 9, 2003

(54) SEGREGATION REDUCING AGENT CONSISTING OF CURDLAN AND ALKALINE SOLUTION AND HYDRAULIC COMPOSITION CONTAINING THE SEGREGATION REDUCING AGENT

(75) Inventors: Young-Hoon Park, Taejon-si (KR);
In-Young Lee, Taejon-si (KR);
Jung-Heon Lee, Taejon-si (KR);
Mi-Kyoung Kim, Taejon-si (KR);
Kyung-Hee Jung, Taejon-si (KR)

(73) Assignees: Korea Research Institute of Bioscience and Biotechnology, Taejon-si (KR); DMJ Biotech Corp., Taejon-si (KR)

( * ) Notice: Subject to any disclaimer, the term of this patent is extended or adjusted under 35 U.S.C. 154(b) by 0 days.

(21) Appl. No.: 09/719,593

(22) PCT Filed: May 4, 2000

(86) PCT No.: PCT/KR00/00425
§ 371 (c)(1),
(2), (4) Date: Dec. 12, 2000

(87) PCT Pub. No.: WO00/68161
PCT Pub. Date: Nov. 16, 2000

(30) Foreign Application Priority Data

May 7, 1999 (KR) ............................................. 99-16263
Apr. 20, 2000 (KR) ........................................ 2000-21091

(51) Int. Cl.$^7$ ............................................. C04B 24/10
(52) U.S. Cl. .................... 106/804; 106/730; 106/205.9; 106/823; 536/123.12
(58) Field of Search ................................. 106/737, 804, 106/205.9, 823; 536/123.12

(56) References Cited

U.S. PATENT DOCUMENTS

| | | | | |
|---|---|---|---|---|
| 3,754,925 A | * | 8/1973 | Kimura et al. ............... | 426/105 |
| 5,154,771 A | * | 10/1992 | Wada et al. ................. | 106/617 |
| 5,174,821 A | | 12/1992 | Matsuoka et al. | |
| 5,376,173 A | | 12/1994 | Haze et al. | |
| 5,573,589 A | | 11/1996 | Tanaka et al. | |

OTHER PUBLICATIONS

Optimal pH Control of Batch Processes for Production of Curdlan by Agrobacterium Species, By J–H Lee et al., published by Journal of Industrial Microbiology and Biotechnology in (1999), vol 23, pp. 143–148.

* cited by examiner

*Primary Examiner*—David Brunsman
(74) *Attorney, Agent, or Firm*—Bachman & LaPointe, P.C.

(57) ABSTRACT

The present invention relates to a segregation reducing agent consisting of curdlan and alkaline materials and a hydraulic composition containing the segregation reducing agent, particularly, the present invention relates to the segregation reducing agent prepared by alkalifying a curdlan-producing fermentation broth per se or a curdlan powder with an alkaline material, and also relates to hydraulic compositions, concrete and mortar, comprising the segregation educing agent. This segregation reducing agent can provide a great segregation reduction effect for hydraulic compositions even at its small amount as well as guarantee the strength, filling ability and fluidity.

6 Claims, No Drawings

SEGREGATION REDUCING AGENT CONSISTING OF CURDLAN AND ALKALINE SOLUTION AND HYDRAULIC COMPOSITION CONTAINING THE SEGREGATION REDUCING AGENT

This application is a 371 of PCT/FR00/00245 filed May 4, 2000.

FIELD OF THE INVENTION

The present invention relates to a segregation reducing agent prepared by alkalifying a curdlan-producing fermentation broth per se or a curdlan powder in solution with alkaline material, and also relates to hydraulic compositions, concrete and mortar, comprising the segregation reducing agent. This segregation reducing agent can provide a great resistance to segregation for hydraulic compositions even at its small amount as well as guarantee the strength, filling ability and fluidity.

BACKGROUND

As main concrete materials, there are specifically enumerated cement, water, fine aggregate and coarse aggregate. However, recent increasingly intensive interest in the high strength and durability of concrete as well as in the economizing of construction with concrete has directed active research toward the development of admixtures capable of providing a variety of functions to concrete. Such admixtures may be representatively exemplified by an AE agent (air entrainment agent), a water-reducing agent and an AE water-reducing agent. Offering a variety of functions, including the improvement of concrete workability, the augmentation of resistance to freezing and thawing, the reduction of the cement amount to be used by virtue of water reducing effect, and the strengthening of concrete strength, the admixtures are recognized as the fifth ingredient for concrete. Generally, the water-reducing agent can bring about a reduction of water by 10 to 30%. However, overuse of the water-reducing agent makes worse the physical properties of concrete, as in the increase of air entrapment and the segregation of the material ingredients.

With he aim of repressing these side effects, polysaccharides have been added as an admixture for concrete. They function to enhance the viscosity of concrete, so as to suppress the segregation of material ingredients and increase the fluidity of concrete.

It is known that a broad spectrum of microbes is able to produce polysaccharides. Polysaccharides that microbes extracelluarly secrete are quite different in terms of molecular weight, kinds of constitutive sugar units, the order, type and position of the linkages between sugar units, and the existence of branches, depending on strains and culture methods. They also exhibit different gelability, emulsion stability, surface tension controllability, water absorptivity, tackifying property, lubricating ability, and. film forming property from one another. Numerous applications of polysaccharides, which are mainly produced from microorganisms, exist in the food, cosmetic, petroleum and paper industries. For instance, they are used as stabilizers, emulsifiers, and thickeners in the food industry. Also, they are useful for excavating or crude petroleum-recovering processes in the petrochemical industry. In addition, polysaccharides have recently been applied for the drag reduction for ships and to make high value-added biomedicines as well as being newly developed as admixtures for construction.

Curdlan, which *Agrobacterum spp.* and *Alcaligenes faecalls* secrete from these cells into an extracellular space, is a water-insoluble, neutral polysaccharide which consists of glucose units bonded to each other through beta-1,3-glycosidic linkage. This homopolymer shows a characteristic physicochemical property of irreversibly forming gel when being heated, so that it is added as a thickener for foods. Thus, the polysaccharide finds numerous applications, including jelly foods, food fibers, film and immobilized carriers (Paul et al., *Biotechnol. Adv.*, 4:245–259, 1986). Particularly, there are disclosed many patents pertaining to use of curdlan as segregation reducing agents for concrete materials.

For example, Korean Pat. No. 144454 (1998), yielded to Daisei Construction. Co. Ltd., Japan and Takeda Chemical Industries, Ltd., Japan, discloses that a powder of beta-1,3-glucan is added to increase the viscosity of a hydraulic composition comprising a binder to suppress the segregation among the materials of the composition and enhance the fluidity of the composition. However, the quantity of curdlan used in the reference patent amounts to from at least 1.36 to 2.96 kg per unit volume ($m^3$) of concrete, giving rise to a large increase in the cost of concrete.

Takeda Industries Ltd., Japan, also discloses in U.S. Pat. No. 5,376,173 a segregation reducing agent which is obtained by adding a highly viscous polysaccharide such as xanthan or methylated cellulose to a culture of a microorganism capable of producing curdlan and drying the mixture to give a powder. In this segregation reducing agent, the employed polysaccharides, that is, a mixture of curdlan and another polysaccharide amounts to as much as 1.6 kg/$m^3$ of concrete, suffering from a disadvantage of increasing the production cost of concrete.

U.S. Pat. No. 5,573,589 describes chemical modification of curdlan in which curdlan is treated with sulfate ($SO^{3-}$) to produce curdlan sulfate which is then used as an admixture for concrete. However, the curdlan used for the preparation of the curdlan sulfate amounts to from as much as 1.75 to 3.15 kg/$m^3$ of concrete, depending on the uses of the modified curdlan.

In the prior arts described above, a powdering process is required for curdlan or its derivatives to be used as a segregation reducing agent for concrete, giving rise to an increase in the production cost, there is needed a collateral cost for the derivatives or auxiliary additives serving to enhance the viscosity of concrete, and the powder should be added at an amount of as much as 1 kg per lube ($m^3$) of concrete in order to show an effect as a segregation reducing agent.

Thus, there remains a need for developing a segregation reducing agent which is simple in its preparation and has a great effect even at a small amount, thereby reducing the production cost.

Leading to the present invention, the intensive and thorough research on segregation reducing agents for hydraulic compositions, repeated by the present invention aiming to use curdlan with a great economical advantage, resulted in the finding that the alkalifying of curdlan powder or a curdlan-producing fermentation broth gives a curdlan solution of high viscosity which brings about a maximal effect in the resistance to segregation with its small amounts and that use of the curdlan-producing fermentation broth itself can eliminate the cost for powdering equipments and processes.

SUMMARY OF THE INVENTION

It is an object of the present invention to overcome the above problems encountered in prior arts and to provide a segregation reducing agent for a hydraulic composition, which brings about a great improvement in resistance to segregation with an economical advantage.

It is another object of the present invention to provide a hydraulic composition containing such a segregation reducing agent.

Based on the present invention, the above objects could be accomplished by a provision of a segregation reducing agent for hydraulic compositions, comprising curdlan and an alkaline material.

Also, in accordance with the present invention, there is provided a hydraulic composition comprising such a segregation reducing agent.

DETAILED DESCRIPTION OF THE INVENTION

In the present invention, curdlan is obtained from a fermentation broth which contains sugar or raw sugar as a carbon source and ammonium chloride as a nitrogen source, in combination with other inorganic salts. As microorganisms grow in the medium, curdlan is secreted from the cells. Preferably, although not necessarily, the curdlan may be purified for use.

Purification of raw curdlan is carried out as follows. A fermentation broth highly rich in curdlan is controlled in neutral pH during growth and production phase. Since curdlan is not dissolved in a neutral solution, curdlan exists as a water-insoluble form. The fermentation broth is alkalified to solubilize the curdlan which is then able to be separated from the cells by centrifugation or filtration. After removal of the cells, the resulting solution is brought into contact with an aqueous organic solution or neutralized to cause the precipitation of curdlan. After being collected by centrifugation, the precipitates are dried to afford purified curdlan powder.

The present invention provides a segregation reducing agent comprising a curdlan-producing fermentation broth itself or a curdlan powder in combination with alkaline material. This segregation reducing agent is prepared and mixed to a hydraulic composition for use as follows.

First, a curdlan-producing fermentation broth itself is used as a segregation reducing agent. One or more of the alkaline solution group consisting of NaOH, KOH, NH$_4$OH, and Ca(OH)$_2$ is added into the fermentation broth, giving an alkaline curdlan solution with pH 10 or higher. This alkaline curdlan solution can be used in its integrity as a segregation reducing agent for hydraulic compositions, such as concrete, mortar and the like. By way of example, NaOH is added at an amount of 2.0 to 20.0 g per liter of the fermentation broth. A hydraulic composition typically comprises cement, water, sand and pebbles and may be added with admixtures such as an AE agent, an AE water-reducing agent, a water reducing agent, etc. Examples of these agents include naphthalene type agents, melamine type agents, carboxylic acid type agents and lignin type agents.

Alternatively, the alkaline curdlan solution is obtained from curdlan powder. The curdlan powder may be prepared by drying the curdlan-producing culture and atomizing the dried residue or by the above described purification process from the culture.

The curdlan of the segregation reducing agent can guarantee a segregation reducing effect at an amount of as low as 0.48 kg per 1 lube of hydraulic composition such as concrete. More amounts than this secure resistance against the segregation of materials as a matter of course and further, reinforce the compression strength of the concrete. A little less amount of the curdlan allows somewhat segregation of the materials, but shows similar compression strength or slump properties to those at the suggested amount.

Therefore, the segregation reducing agent prepared by mixing curdlan with an alkaline material according to the present Invention can bring about a maximal effect on the resistance to segregation even at a small amount, unlike conventional segregation reducing agents.

There is a need to examine the segregation reducing effect of the segregation reducing agent on a hydraulic composition such as concrete. In this regard, a hydraulic concrete composition is prepared, followed by measuring the segregation reducing agent for segregation reduction and fluidity improvement. To prepare one lube (m$^3$) of the concrete composition, 150–200 kg of water, 300–500 kg of a cement-containing binder, 350–900 kg of sand, and 600–1,000 g of pebbles are mixed in combination with 5–15 kg of a water-reducing agent and 5–50 kg of the segregation reducing agent consisting of curdlan and alkaline material. The curdlan is preferably used at an amount of 0.15–1.5 kg per lube of concrete. To make a hydraulic concrete composition, cement, sand and pebbles are mixed for 1 min in the absence of water in a stirrer with a diameter of 75 cm, and then stirred for 3 min at a stirring speed of 30 rpm, along with water, a water-reducing agent and the segregation reducing agent. The fluidity and strength of the composition are measured.

The segregation reducing agent of the present invention can be also used as an admixture for a mortar. To prove the segregation reducing agent worthy of an admixture, a hydraulic mortar composition 1s prepared, followed by evaluating the segregation reducing agent for segregation reduction and fluidity improvement. To prepare one lube (m$^3$) of a mortar concrete composition, 500–650 kg of water, 700–850 kg of cement, and 1,600–1,900 kg of sand are mixed in combination with 100–200 g of a naphthalene-based water-reducing agent and 0.2–1 kg of the segregation reducing agent. Cement and sand are mixed for 1 min in the absence of water in a stirrer with a diameter of 75 cm, and then stirred for 3 min at a stirring speed of 30 rpm, along with water, a water-reducing agent and the segregation reducing agent to give a hydraulic mortar composition and a measurement is made of the fluidity and strength of the composition.

Practical and presently preferred embodiments of the present invention are illustrative as shown in the following examples.

However, it will be appreciated that those skilled in the art on consideration of this disclosure, may make modifications and improvements within the spirit and scope of the present invention.

EXAMPLE 1

Preparation of Hydraulic Composition with Segregation Reducing Agent Comprising Curdlan-Producing Fermentation Broth Curdlan-producing microorganisms were cultured for four days in a fermentation medium containing sugar or raw sugar as a carbon source, ammonium chloride as a nitrogen source and other inorganic salts to produce 65 g of curdlan per liter of the culture. In a later phase, the culture was measured as pH 5.5 with existence of curdlan in a water-insoluble form. NaOH was added at an amount of 2.0 to 4.0 g per liter of the culture to adjust the pH of the culture into 11.4 to 12. This resulting alkaline culture broth was used as a segregation reducing agent with a content of curdlan amounting to 60 g/liter.

The formulation to compose a concrete composition was as small as one thirty-third of the amount for applying to the lube (m³) of concrete. 13.5 kg of cement, 25.67 kg of sand, and 24.63 kg of pebbles were mixed in the absence of water in a stirrer with a diameter of 75 cm and then, stirred at 30 rpm for 3 min. along with 5.16 kg of water, 391.5 kg of a water-reducing agent, and 240 ml of the segregation reducing agent prepared above, to give a hydraulic concrete composition. In the alkaline segregation reducing agent (pH 10 or higher), 14.5 g of curdlan was dissolved, corresponding to 0.48 kg based on one lube of concrete.

The concrete composition obtained was measured for fluidity and strength. In the regard of fluidity evaluation, the concrete was packed close in a standard size slump mold (20 cm in bottom diameter, 10 cm in too diameter, 30 cm in height) and then, when the mold was lifted up, a slump flow value was reasured in the length to which the concrete spread. As for the strength of concrete, it was determined 3, 7 and 28 days after the curing of concrete in a mold with a diameter of 10 cm. The results are given in Table 1, below.

TABLE 1

Evaluation for Physical Properties of Concrete Comprising Segregation Reducing Agent Prepared By Alkalifying Curdlan Culture

| Sample No. | pH of Agents | Slump Flow (cm) | Strength (kg.f/cm2) (3-7-28 days later) | Aggregate Segregation |
|---|---|---|---|---|
| 1 | 11.4 | 68 × 66 | 216-441-538 | slightly occurred |
| 2 | 11.6 | 65 × 66 | 204-427-562 | slightly occurred |
| 3 | 11.8 | 63 × 63 | 212-470-581 | None |
| 4 | 12.0 | 62 × 61 | 170-442-477 | None |

As a result of measuring the fluidity of concrete, low viscosity and dehydration were observed in Concrete Sample No. 1 and 2, which both comprised segregation reducing agents to which NaOH was added at an amount of less than 3.0 g/l. On the other hand, when 3.0 g/l or greater of NaOH was added to the curdlan cultures, high fluidity was detected without material segregation as shown in Concrete Sample No. 3 and 4. Viscosity increased in proportion to the amount of NaOH added. Measurement of strength demonstrated that addition of 3 g/l or greater of NaOH, although somewhat poor in initial strength, led to a gradual strengthening of the concrete with a lapse of time.

EXAMPLE 2

Preparation of Hydraulic Composition with Segregation Reducing Agent Comprising Curdlan Powder From curdlan-producing fermentation broths, microorganisms and curdlan were separated by centrifugation, and the supernatant deprived of cell debris was dried, followed by pulverizing the dried residues into powders with an average diameter of 0.09 mm. Curdlan was found to amount to 80 wt % of the powder with the remainder consisting of cell debris and inorganic materials. This curdlan powder in its Integrity was used as a segregation reducing agent in the same manner as in Example 1 to give a hydraulic concrete composition (No. 1). Alternatively, solutions of the curdlan powder in water (No. 2) and in a 0.1 N NaOH solution (No. 3) were used as segregation reducing agents in the same manner as in Example 1 to give hydraulic concrete compositions, respectively. In all of the above three cases, the amount of the curdlan used was 14.5 g.

The hydraulic compositions prepared above(No. 1, No. 2, No. 3) were measured for fluidity and strength and evaluated for filling ability and resistance to material segregation through a gap passing box experiment. The fluidity and strength of he hydraulic c compositions were measured according to the procedure described in Example 1. Filling ability was determined by the heights to which the hydraulic compositions rose. When a sieving experiment was conducted, the gaps which sample materials passed were used to determine the homogeneity of the sample materials. The results are given in Table 2, below.

TABLE 2

Physical Properties of Concrete Compositions Employing Segregation Reducing Agents Prepared from Curdlan Powder per se, Neutral Solution and Alkaline Solution of Curdlan

| Sample No. | Segregation Reducing Agents | Slump Flow (cm) | Strength (kg.f/cm2) (3-7-28 days later) | Aggregate Segregation |
|---|---|---|---|---|
| 1 | Curdlan Powder | 72 × 75 | 126-196-276 | occurred |
| 2 | Curdlan in Water | 70 × 71 | 129-208-295 | occurred |
| 3 | Curdlan in 0.1 N NaOH | 64 × 65 | 125-265-382 | none |

As indicated in Table 2, when curdlan powder was used in its integrity or in a dissolved state in water, high fluidity was measured, but the compositions suffered from serious aggregate segregation with a decrease of compression strength. The aggregate segregation made it difficult for the sample materials to pass the gaps of the box as well as lowered the filling ability.

In contrast, the segregation reducing agent (No. 3), obtained by dissolving the curdlan powder in the NaOH solution, showed high fluidity as measured in a slump flow value of 64×65 cm. The resulting hydraulic composition was measured to be of high strength without aggregate segregation. The gap passing box experiment showed that the composition was homogeneous with excellent filling ability.

Together with the result of Example 1, these data demonstrate the highly positive effect of alkaline solutions on the physical properties of hydraulic compositions employing curdlan as a segregation reducing agent. Irrespective of the phases (liquid or powder) of the curdlan added, the use of an alkaline solution reduces the amount of the curdlan, bringing about greater improvements in the physical properties of the hydraulic compositions.

EXAMPLE 3

Effect of Curdlan Amount on Aggregate Segregation

Various amounts of the curdlan powder prepared as in Example 2 were used to give hydraulic compositions which were then measured for aggregate segregation. The results are given in Table 3, below. As shown in Table 3, 0.5 kg or greater of curdlan per lube (m³) of concrete caused no aggregate segregation with excellency in slump flow value and compression strength. When curdlan was used at an amount of 0.3 kg per lube of concrete, only insignificant aggregate segregation occurred, but there were found no large differences in slump flow value and strength compared to when the curdlan was used at 0.5 kg or greater.

TABLE 3

Aggregate Segregation Effect According to Curdlan Amount

| Amount of Curdlan (kg/m$^2$) | Slump Flow (cm) | Strength (kg.f/cm2) (3-7-28 days later) | Aggregate Segregation |
|---|---|---|---|
| 3.3 | 65 × 65 | 200-310-483 | slightly occurred |
| 0.5 | 65 × 65 | 219-344-512 | None |
| 0.7 | 62 × 64 | 202-330-512 | None |

INDUSTRIAL APPLICABILITY

As described hereinbefore, the segregation reducing agent prepared by alkalifying curdlan in accordance with the present invention exerts a great segregation reduction effect on hydraulic compositions even at its small amount. In addition to curdlan powder, a curdlan-producing fermentation broth can be used per se for the preparation of the segregation reducing agent. Where the broth is utilized, the powdering processes of curdlan, such as curdlan separating, drying and pulverizing processes, are not necessary so that there can be brought about a great reduction in the cost needed for the equipments and operation of processes. Thus, a remarkable reduction in the production cost of the segregation reducing agent results. In addition, the segregation reducing agent of the present invention can be applied for mortar, providing a great thickening effect. Consequently, the segregation reducing agent of the present invention can find useful applications in the concrete and mortar industries.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A segregation reducing agent, comprising curdlan and an alkaline material in an amount of 2–20 g per liter of the segregation reducing agent.

2. The segregation reducing agent according to in claim 1, wherein the curdlan is in a phase of a curdlan-producing fermentation broth or in a phase of a powder.

3. The segregation reducing agent according to claim 1, wherein the alkaline material is selected from the group consisting of NaOH, KOH, Ca(OH)$_2$, NH$_4$OH, and mixtures thereof.

4. The segregation reducing agent according to claim 1, which is of pH 10 or higher.

5. A hydraulic composition, comprising the segregation reducing agent of claim 1.

6. The hydraulic composition according to claim 5, which are concrete and mortar.

* * * * *